(12) United States Patent
Bokhari et al.

(10) Patent No.: US 8,001,490 B2
(45) Date of Patent: Aug. 16, 2011

(54) SYSTEM, METHOD AND COMPUTER PROGRAM PRODUCT FOR A CONTENT PUBLISHER FOR WIRELESS DEVICES

(75) Inventors: Wasiq Mahood Bokhari, Fremont, CA (US); Umair Azim Khan, Fremont, CA (US); Anne Sajer Kohnen, Portland, OR (US); Quinton Yves Zondervan, Boston, MA (US)

(73) Assignee: NVIDIA International, Inc., St. Michael (BB)

( * ) Notice: Subject to any disclaimer, the term of this patent is extended or adjusted under 35 U.S.C. 154(b) by 2126 days.

(21) Appl. No.: 09/902,929

(22) Filed: Jul. 10, 2001

(65) Prior Publication Data
US 2003/0013492 A1   Jan. 16, 2003

(51) Int. Cl.
*G06F 3/00* (2006.01)

(52) U.S. Cl. ......... 715/864; 715/853; 715/854; 715/745

(58) Field of Classification Search .................. 715/864, 715/853, 854, 745; 345/864, 853, 854, 745
See application file for complete search history.

(56) References Cited

U.S. PATENT DOCUMENTS

| | | | | |
|---|---|---|---|---|
| 4,661,000 A | * | 4/1987 | Shinbori | 400/83 |
| 5,627,977 A | * | 5/1997 | Hickey et al. | 345/746 |
| 5,798,759 A | * | 8/1998 | Dahl | 345/745 |
| 6,016,476 A | * | 1/2000 | Maes et al. | 705/1 |
| 6,610,105 B1 | * | 8/2003 | Martin et al. | 715/513 |

OTHER PUBLICATIONS

Firepad, Inc. "FireViewer Suite Installation Manual and User's Guide". Mar. 2000.*
Bachmann, Glenn. "Palm Programming". Sams Publishing, 1999. pp. i, ii, 15, 33-39.*
FireViewer Suite 6.0 Shareware Screenshot. "www.5star-shareware.com/PDA/Palm/Graphics/fire-viewer.html". Jun. 17, 2001.*

* cited by examiner

*Primary Examiner* — Michael Roswell
(74) *Attorney, Agent, or Firm* — Zilka-Kotab, PC

(57) ABSTRACT

A system, method and computer program product are provided for managing content for output on a wireless device. Content selected for output on a wireless device is displayed on a management screen substantially as it will be displayed on the wireless device. Organization and formatting of the content is allowed. A method for structuring navigation data in a wireless publisher is provided. Content selected for output on a wireless device is aggregated in a habitat having views with windows. An identifier of each of the views and windows is depicted in a navigation tree. Links of the windows are displayed under the identifiers of the associated windows. Linking from one window in one view to another window in another view using the navigation tree is allowed. In a further embodiment of the present invention, a method for presenting a preview of content on a display of a wireless device is provided.

44 Claims, 17 Drawing Sheets

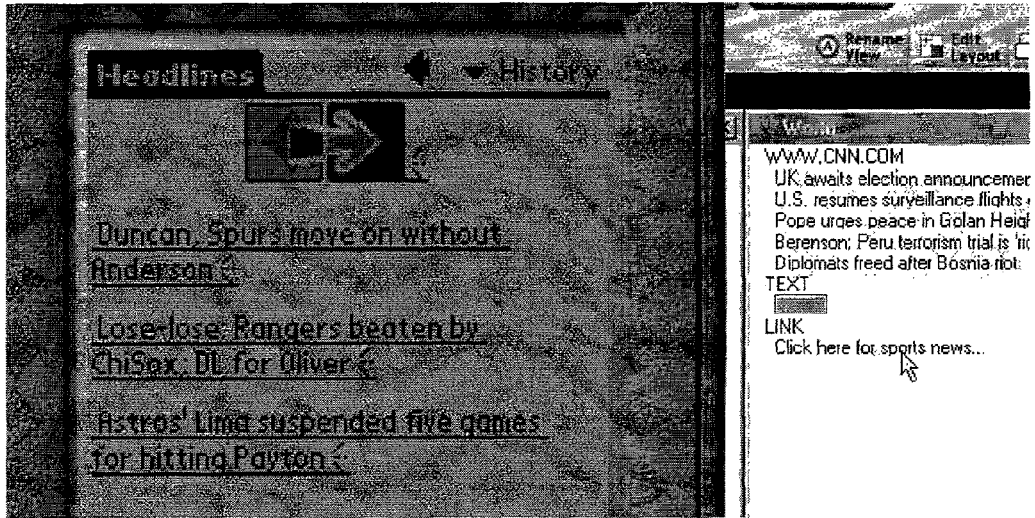
FIG. 10
1102   FIG. 11

SYSTEM, METHOD AND COMPUTER PROGRAM PRODUCT FOR A CONTENT PUBLISHER FOR WIRELESS DEVICES

FIELD OF THE INVENTION

The present invention relates to wireless web content, and more particularly to publishing Internet-based content for display on wireless devices.

BACKGROUND OF THE INVENTION

With the advent of wireless devices, the current shift in communications is to allow wireless access to content on the Internet. Current methods of delivering web-based content to wireless devices, however, requires that each site have wireless enabled content. Accordingly, a significant engineering investment is required on a web-site by web-site basis to enable each web-site to become wireless enabled. This is the biggest bottleneck in the wireless enabling of the web.

Thus, what is needed is a way to make all content on the web, from any location in the world, wireless enabled by aggregating user selected content at one site and making that selected content wireless enabled. The one site thus behaves as a gateway between the wireless and wired web. Utilizing the present invention, the entire world wide web can be wireless enabled without requiring an engineering investment on a website by website basis.

SUMMARY OF THE INVENTION

A system, method and computer program product are provided for managing content for output on a wireless device such as a personal digital assistant (PDA), a handheld computer, a wireless telephone, a device connected to a wireless modem, a pager, a standard telephone that transmits text-to-speech audio output, etc. Content selected for output on a wireless device is displayed on a management screen. The content is displayed substantially as it will be displayed on the wireless device. In other words, the format, organization, text length and content, and positioning of content (including links, text, graphics, etc.) are shown very nearly to the way they will be output on the display of the wireless device. Note that the positioning of content items can be denoted by visual cues. Organization and formatting of the content is allowed. A link to content can be created. Further, text can also be added and image files can be uploaded for output on the wireless device.

In one aspect of the present invention, the content is first aggregated in a habitat. A graphic can be imported directly from a data source for output on the wireless device. In another aspect of the present invention, a link can be dragged and dropped into the management screen. As an option, a maximum character length of text content displayed upon selection of a link on the wireless device is configurable. This allows the user to select how many characters of the text content are displayed. As another option, a number of lines of text content displayed upon selection of a link on the wireless device is configurable. This allows the user to select how many lines of the text content is displayed.

In another aspect of the present invention, the user can drag and drop a table, which is automatically reformatted for display on the device. In this context, a table can include for example an HTML page, which has been formatted using a tabular format where each table is composed of individual cells distributed into a number of rows and columns. A table may also contain other tables within its individual cells. In a further aspect, a preview of the content as the content is displayed on the wireless device is output.

In another embodiment of the present invention, a method for managing content for output on a wireless device is provided. Content selected for output on a wireless device is aggregated in a habitat. The aggregated content is displayed on a management screen. Organization and formatting of the content is allowed. The creation of links to content is also allowed. The content is converted into a format amenable to display on a wireless device. The converted content is output to a wireless device.

In yet another embodiment of the present invention, a method for structuring navigation data in a wireless publisher is provided. Content selected for output on a wireless device is aggregated in a habitat having views, each of the views having windows associated with them. An identifier of each of the views is depicted in a navigation tree. Identifiers of the windows are shown under the identifier of the associated view in the navigation tree. Links of the windows are displayed under the identifiers of the associated windows. As an option, only those "artificial" links, or the ones that the user creates from one window or view to another window or view, are shown in the navigator tree. Linking from one window in one view to another window in another view using the navigation tree is allowed. As another option, a link is created in a window upon dragging a link from a web page or other window onto the identifier of the window in the navigation tree.

In a further embodiment of the present invention, a method for presenting a preview of content on a display of a wireless device is provided. Content selected for output on a wireless device is aggregated in a habitat. The content is displayed on a management screen amenable to allowing formatting of the content. A preview of the content as displayed on the wireless device is presented. In one aspect of the present invention, the preview further includes a depiction of a chassis of the wireless device.

BRIEF DESCRIPTION OF THE DRAWINGS

FIG. 10 illustrates a preview showing the content displayed on the wireless device upon selecting the link shown in FIG. 9;

FIG. 11 shows how text can be captured from a web page and placed in a habitat;

DESCRIPTION OF THE PREFERRED EMBODIMENTS

The present invention provides a wireless publisher for instantly formatting content for output on a wireless device.

Figure 1:
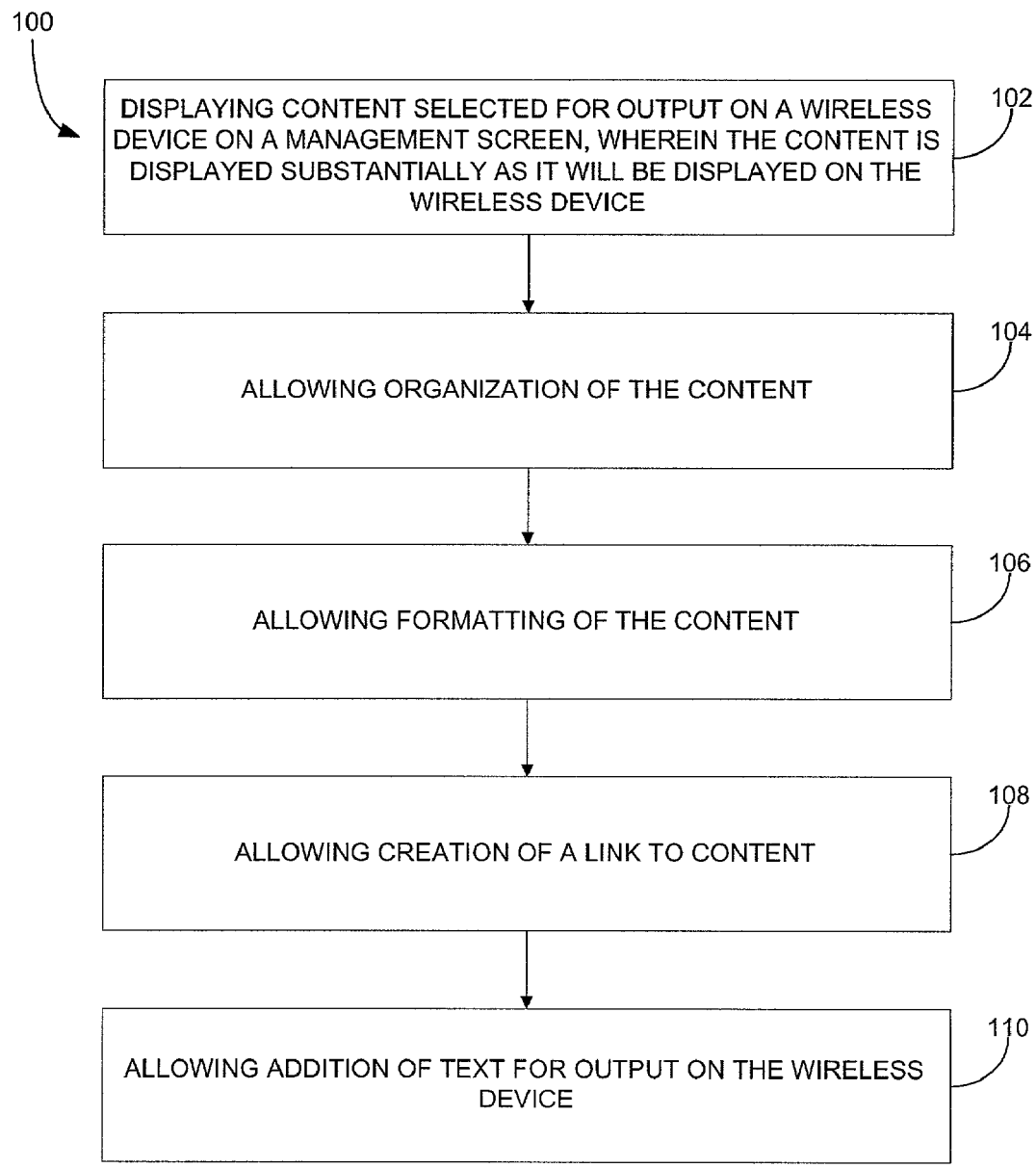
FIG. 1 is a flowchart of a process for managing content for output on a wireless device.

FIG. 1 is a flowchart of a process 100 for managing content for output on a wireless device such as a personal digital assistant (PDA), a handheld computer, a wireless telephone, a device connected to a wireless modem, a pager, etc. In operation 102, content selected for output on a wireless device is displayed on a management screen. The content is displayed substantially as it will be displayed on the wireless device. In other words, the format, organization, text length and content, and positioning of content (including links, text, graphics, etc.) are shown very nearly to the way they will be output on the display of the wireless device. Note that the positioning of content items can be denoted by visual cues. Organization and formatting of the content is allowed in operation 104. In operation 106, formatting of the content is allowed. A link to content is created in operation 108. In operation 110, text can also be added for output on the wireless device. The contents can also be audibly output on the wireless device. Likewise, text content can be formatted for output on the wireless device, using a voice synthesizer. Note that the processes and concepts discussed in this document can be readily applied to wired devices by one skilled in the art without undue experimentation. Wired devices are those having a physical connection to a network, i.e., a hardwired connection.

Content that is to be published on a wireless device is preferably aggregated in a habitat. The content stored and/or shown in the habitat is then manipulated for output on the wireless device.

Figure 2:
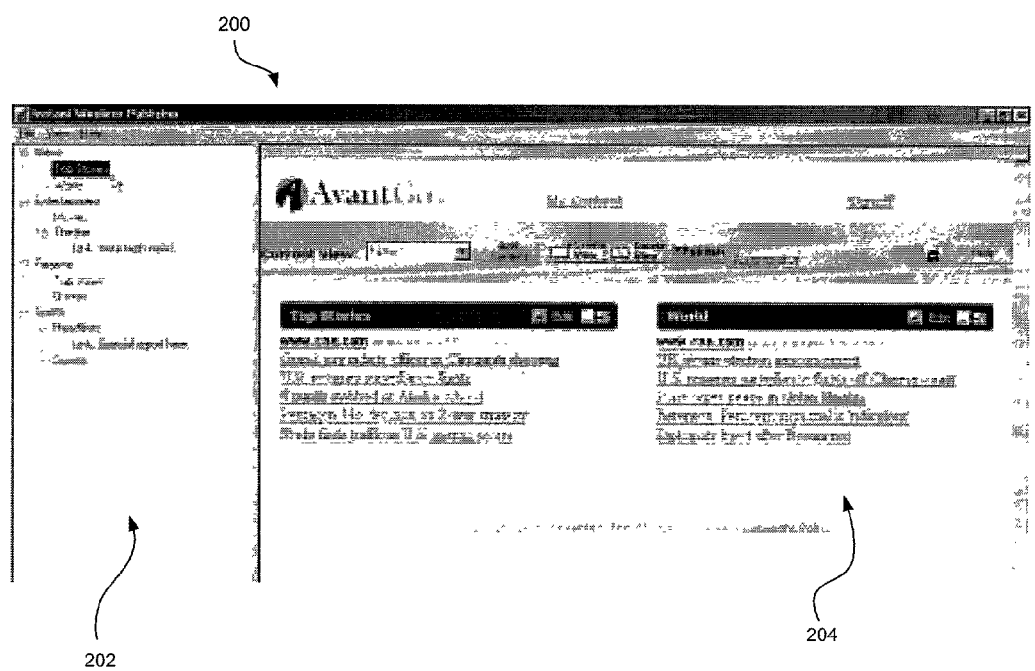
FIG. 2 illustrates a navigation structuring interface of the wireless publisher habitat.

FIG. 2 illustrates a navigation structuring interface 200 of the wireless publisher habitat. As shown, one portion of the interface includes a navigation tree 202 while another depicts a habitat preview portion 204. The navigation tree presents a tree-like view of the habitat's views, windows, and created links (artificial links between windows and/or views). The habitat preview portion comprises "views", each of which contain multiple windows. For example, a News view is shown in FIG. 2. In that view, the windows are Top Stories and World. Each of these windows includes links to content and/or applications as well as, optionally, graphics.

Figure 3:
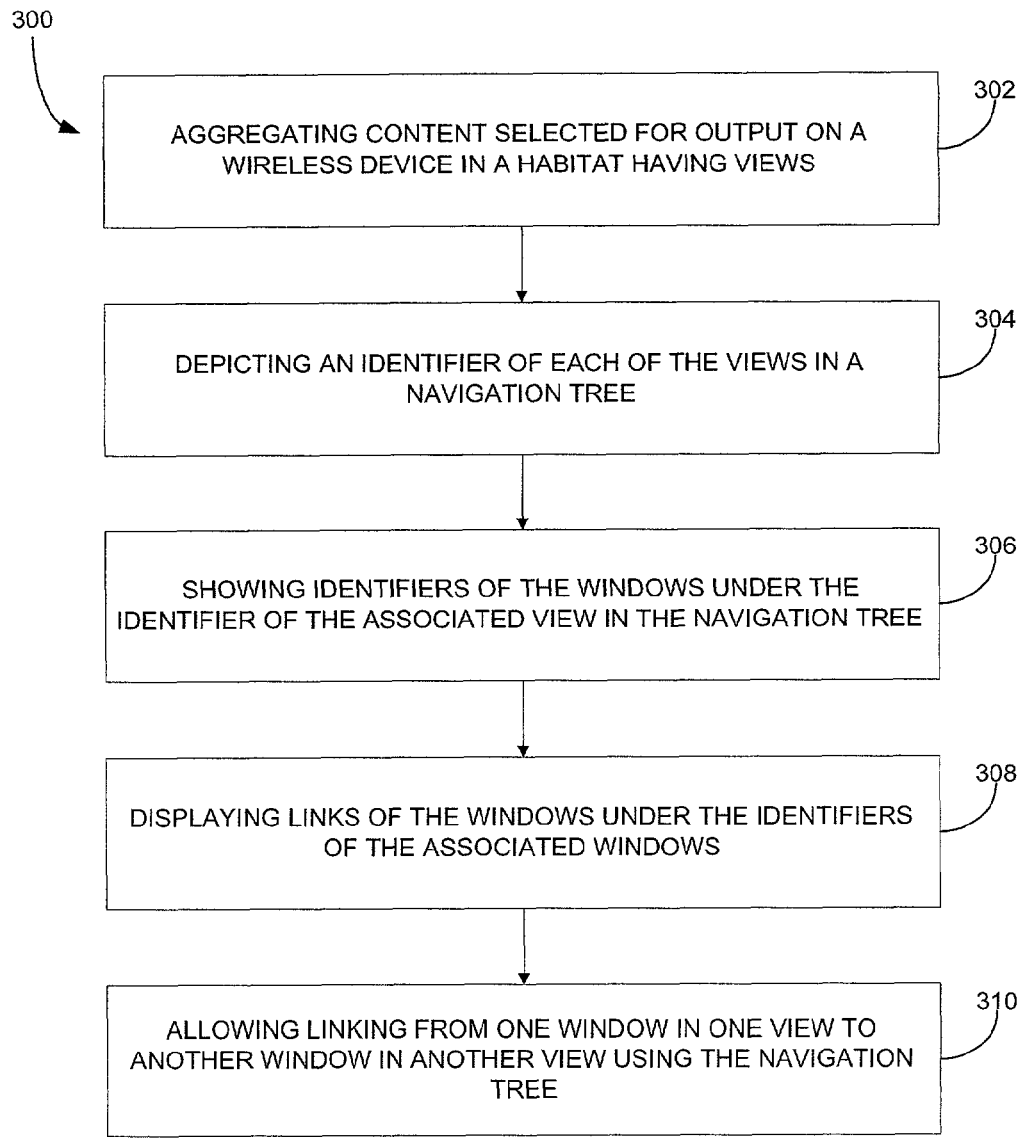
FIG. 3 is a flowchart of a process for structuring navigation data in a wireless publisher.

FIG. 3 illustrates a process 300 for structuring navigation data in a wireless publisher. In operation 302, content selected for output on a wireless device is aggregated in a habitat having views, each of the views having windows associated with them. In operation 304, an identifier of each of the views is depicted in a navigation tree. Identifiers of the windows as shown under the identifier of the associated view in the navigation tree in operation 306. Links of the windows are displayed under the identifiers of the associated windows in operation 308. In operation 310, linking from one window in one view to another window in another view using the navigation tree is allowed.

The number of windows in a view is completely configurable. The user may create or delete as many views as he/she may desire. This user interface allows a user to cleanly categorize related information within individual windows and views. This provides a user one place to access all of his/her favorite information and content from the web. This content includes (but is not limited to) (a) News and Information headlines (of all sorts) (b) Information about email, bank and other accounts (c) Information about shopping and comparison of rates and prices (d) Graphs, Images, Sounds (e) pre-recorded transaction patterns, (f) applications or any other media.

This content is presented to the user with an ability to edit and manage it intuitively and interactively. Some of the features of the management process include (a) a presentation of the user's selected information over a configurable number of days in the past (b) an ability to select, maximize, minimize, refresh or edit the content of individual windows (c) to "publish" user's views into a directory of views and (d) ability to "hide" windows or views so they are not displayed on the wireless device upon startup (like all default views and windows). Instead the content inside hidden windows and views can be queried indirectly, through "artificial" links.

The interface that allows the user to create his/her customized portal is based on an intuitive drag and drop capability. The user simply selects the sources or headlines of choice and drags and drops them into windows and views of choice. The drag and drop feature also makes customization very easy for the user, allowing quick compilation and management of their preferred content.

The user can also drag and drop sources or headlines into the desired item on the navigation tree to add them to a window. A link to the content then appears in the window. Ideally, the actual content—headline, etc—appears in the window, rather than a link to it.

The navigation tree allows rapid and efficient viewing and manipulation of views and windows. For example, if a user is viewing the Top Stories in the News view and wants to go to the Scores window in the Sports view, he or she no longer has to drill all the way out of the News view and into the Sports view, but rather can simply select the Scores menu item under the Sports menu item.

Figure 4:
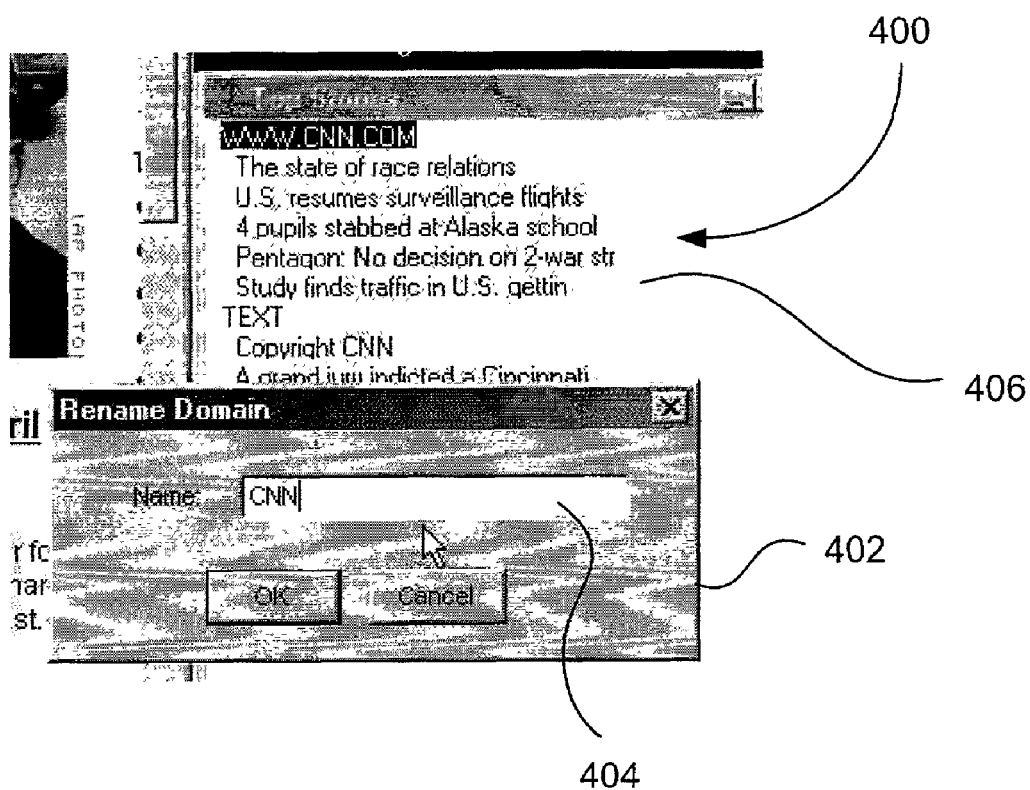
FIG. 4 illustrates a habitat content manager window where the content to be output to the wireless device is managed.

FIG. 4 illustrates a habitat content manager window 400 where the content to be output to the wireless device is managed. From this window, the content is selected and text strings are set. Links to additional content can also be generated. In the example shown in FIG. 4, the Tops Stories window of the News view is shown with links 406 to various news articles listed under the domain name, "WWW.CNN.COM." Links to news articles (some of which are also shown on the Top Stories page of the habitat shown in FIG. 2) are positioned under the domain from which the links were taken and will be output on the wireless device in this order.

In a preferred embodiment of the present invention, options and tools are accessed in the navigation structuring interface by right-clicking on an item in the navigation tree or item in the habitat preview portion, upon which a pop-up menu with selectable options/tools is displayed. For example, right-clicking in a white space of the content manager window calls a menu providing access to tools such as Create Text (for inserting text and links), Import File (for inserting graphics), Paste Text (for pasting text from a clipboard), etc. Also for example, right-clicking on a domain name brings up a menu for tools such as Rename Domain (for renaming the domain for display), Show Domain (for toggling whether the domain is shown on the wireless device), Align (for left/center/right justifying items in the habitat), etc. In a further example, the menu displayed upon right-clicking on a link or text item in the content manager window provides access to formatting options, designation of content source, an Insert Space feature (for inserting a carriage return), etc. These features are preferably ActiveX tools. More information on these and additional options/tools follows.

Views, windows, domains, links, etc. can be renamed, such as by right-clicking a mouse and selecting a Rename menu item from a pop-up menu (shown in FIG. 5) and entering the new name. FIG. 4 illustrates a Rename Domain window 402 presented upon right-clicking on a domain name. The desired domain name is entered in the Name field 404 of the Rename Domain window. The entered name replaces the domain name. For example, as shown in FIG. 4, the domain "WWW.CNN.COM" is renamed to CNN by typing CNN in the name field of the Rename Domain window. In this way, the user does not have to see the entire URL.

Figure 5:
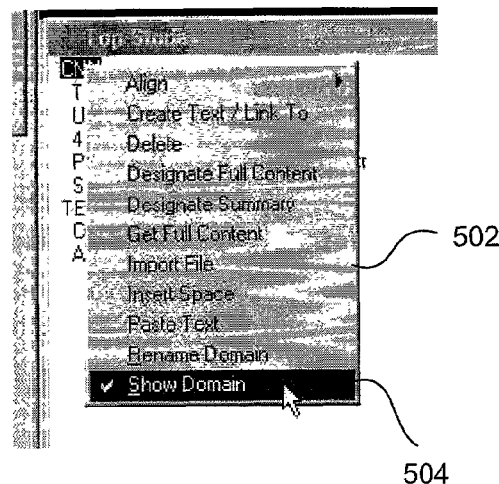
FIG. 5 depicts a pop-up menu for formatting content.

Domain names are not necessarily shown by default. As shown in FIG. 5, to display a domain name on the wireless device, a pop-up menu 502 is called by right clicking on the domain name on the content manager window. The Show Domain item 504 is toggled "on" so that the domain name is displayed on the wireless device.

Figure 6:
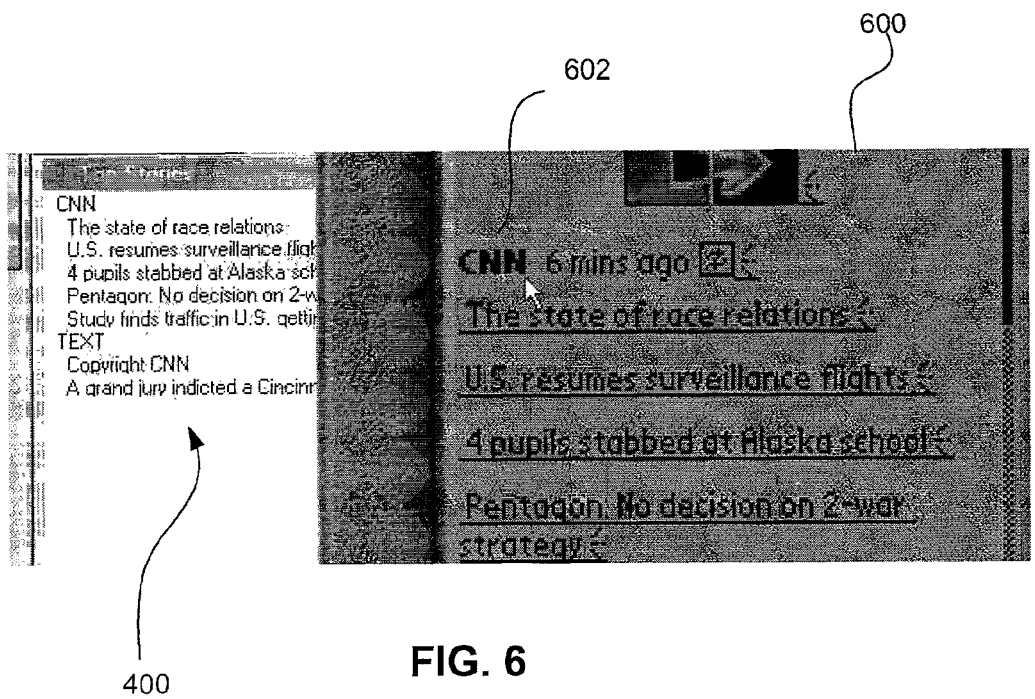
FIG. 6 depicts a preview of the display of the wireless device showing a renamed domain name.

FIG. 6 depicts a preview 600 of the display of the wireless device showing the domain name 602. In this example, the links shown on the Top Stories page are also displayed on the preview.

Figure 7:
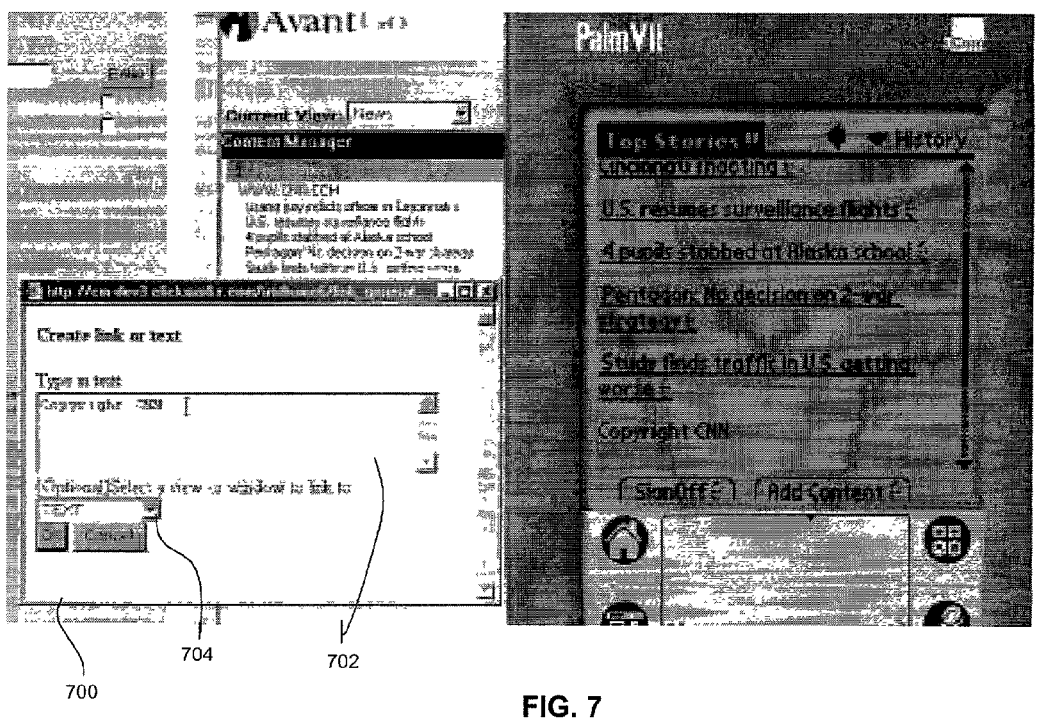
FIG. 7 depicts a Create link or text window presented upon selecting a "Create Text" menu item from a pop-up menu.

FIG. 7 depicts a Create link or text window 700 presented upon selecting the "Create Text" menu item from a pop-up menu accessed by right-clicking at a desired position in the content manager window. Static text and/or links are added to the habitat at the desired position by typing in the text-input field 702 of the Create link or text window and selecting the "OK" button. Note that text can also be dragged and pasted into the create link or text window. Also, by right clicking on an item in the content manager display and following this procedure, the text is inserted below the item. In use, the Create Text function allows insertion of text to provide visual cues, additional description, etc. This feature also allows insertion of text that otherwise may not be desirable for display on the wireless device, such as outlined or colored text that may further be particular to the publisher of the web page. Additionally, this feature can be used to label graphics.

Figure 8:
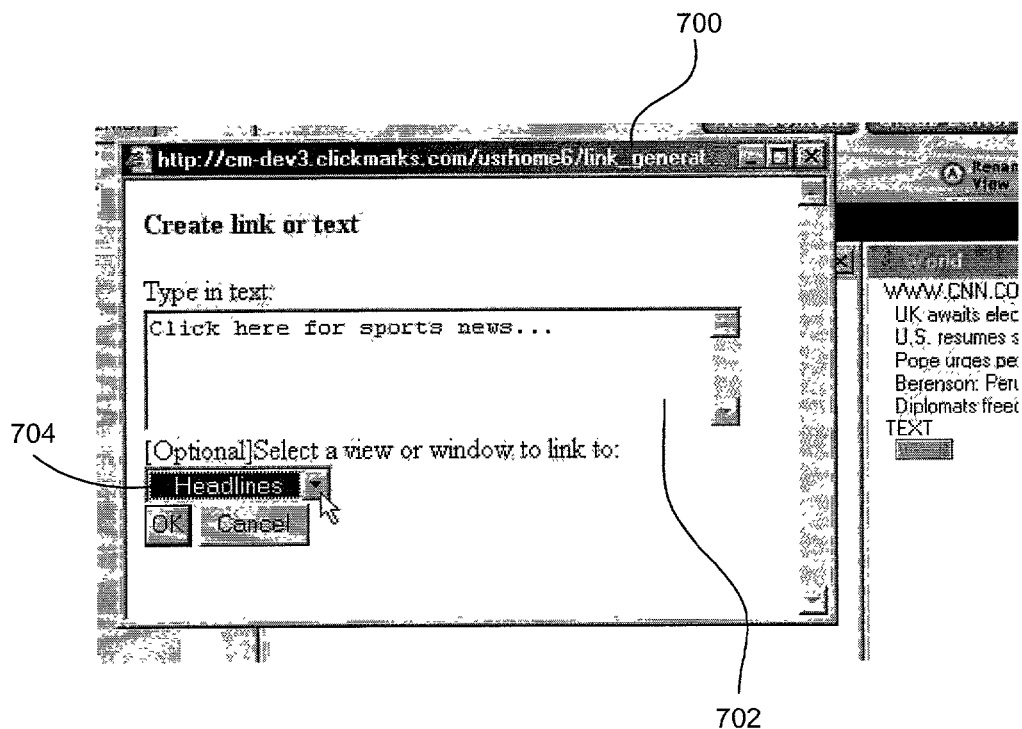
FIG. 8 illustrates the Create link or text window in the aspect of creating a link.
Figure 9:
FIG. 9 depicts a preview showing a link created using the Create link or text window.

The present invention allows creation of links from a window to another window or view. FIG. 8 illustrates the Create link or text window 700 in the aspect of creating a link. The character of the input text (static text or link) is determined by selecting Text or Link To from a drop down menu 704. If the input text is characterized as a link, the contents of the view or window it links to is output upon selection of the link on the wireless device. In the example shown in FIG. 8, the (Sports) "Headlines" window is selected from the drop-down menu. Upon selecting the "OK" button, the text "Click here for sports news . . . " is added to the habitat and is linked to the (Sports) "Headlines" window. FIG. 9 depicts a preview 900 showing the link created in this example. FIG. 10 illustrates a preview 1000 showing the content displayed on the wireless device upon selecting the link created in this example.

The Create link function can also be used to edit the text of an existing link and to convert static text into a link by right clicking on the text string and editing the text in the Create link or text window.

Figure 12:
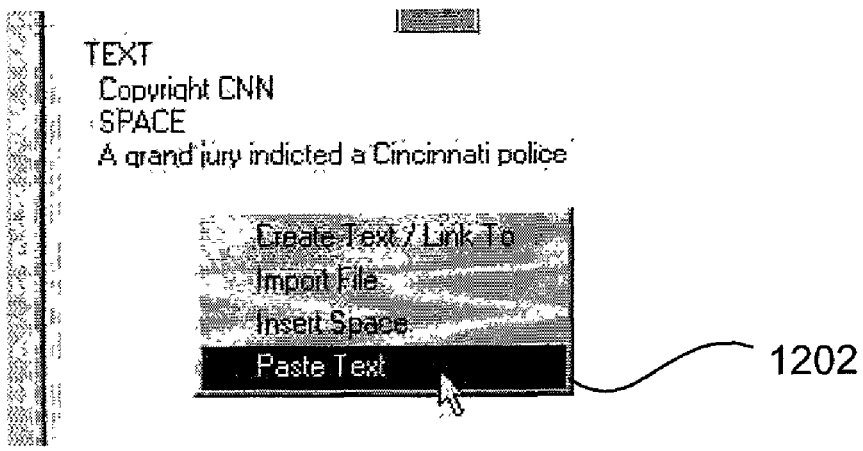
FIG. 12 illustrates another manner to capture text for insertion in the habitat.

FIG. 11 shows how text can be captured from a web page and placed in the habitat. As shown, text 1102 is highlighted and dragged and dropped into the habitat. FIG. 12 illustrates another manner to capture text for insertion in the habitat. Text stored on a clipboard is placed in the habitat upon selecting the right-click menu Paste Text option 1202.

Figure 13:
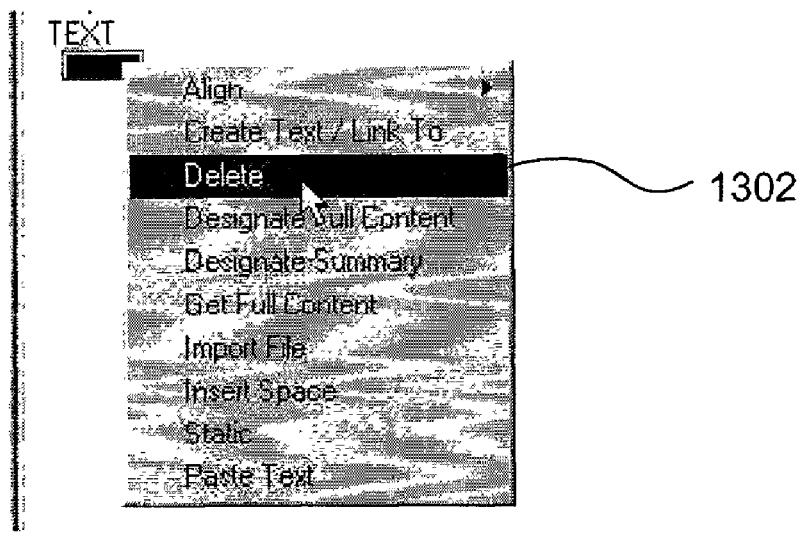
FIG. 13 depicts a Delete function menu item of a right-click pup up menu.

FIG. 13 depicts a Delete function menu item 1302 of a right-click pop up menu. An item can be deleted from the habitat by right-clicking on it to call up the menu and selecting the Delete option.

Figure 14:
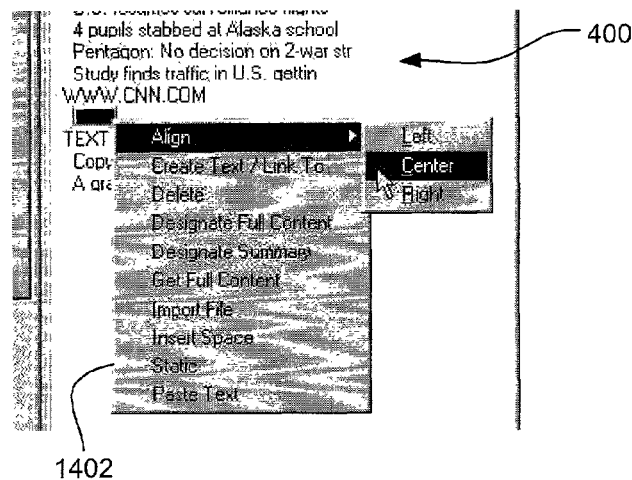
FIG. 14 depicts selection of alignment options from a pop-up menu.
Figure 15:
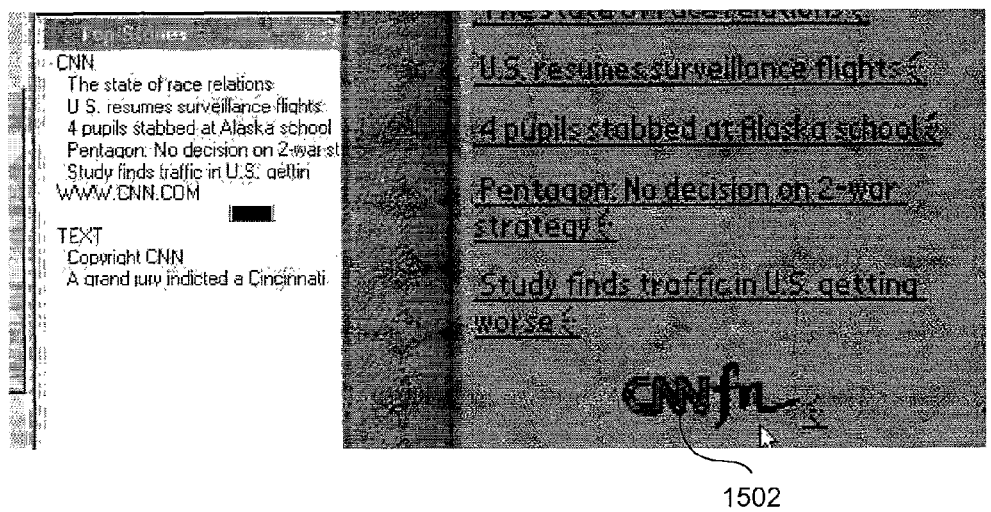
FIG. 15 shows a result of selecting a Center option for a graphic.

FIG. 14 depicts selection of alignment options from a pop-up menu 1402. These options allow the user to left/center/right justify items such as graphics, text and other content in the habitat by right-clicking on the object and then selecting Align and then Left, Center or Right from the menu shown. FIG. 15 shows the result of selecting the Center option for the graphic "CNNfn" 1502. As shown, the graphic is centered in the content manager window as well as on the display of the wireless device. Thus, the positioning of content items can be set for display on the wireless device. Note that this feature is particularly useful for images, as they are generally smaller than the width of a PDA display screen.

Figure 16:
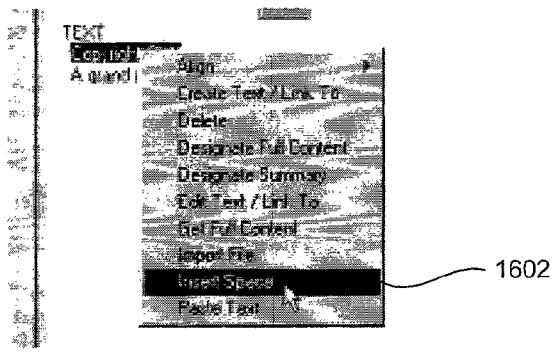
FIG. 16 illustrates an Insert Space feature.
Figure 17:
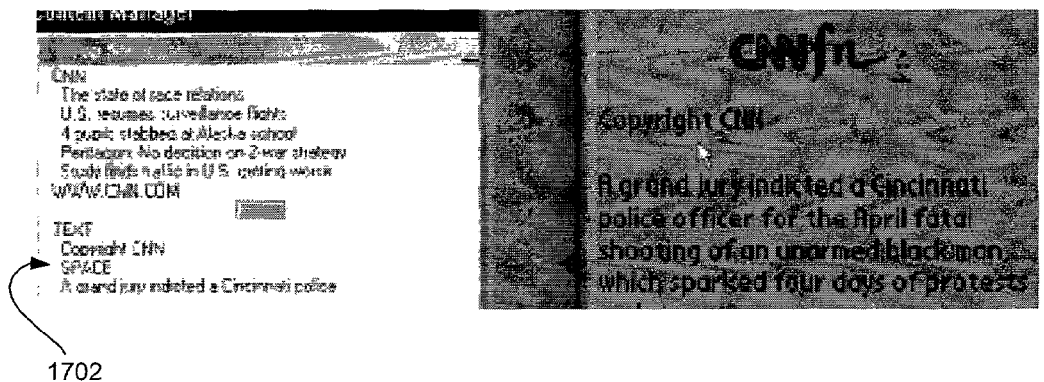
FIG. 17 illustrates a space that has been inserted between two items in the habitat.

FIG. 16 illustrates an Insert Space feature 1602. This feature allows insertion of a space between two items in the habitat. Preferably, the space is about equal to that of a carriage return. FIG. 17 illustrates a space 1702 that has been inserted between two items in the habitat. As shown, the word "SPACE" provides a visual cue that a space has been entered at that position.

Figure 18:
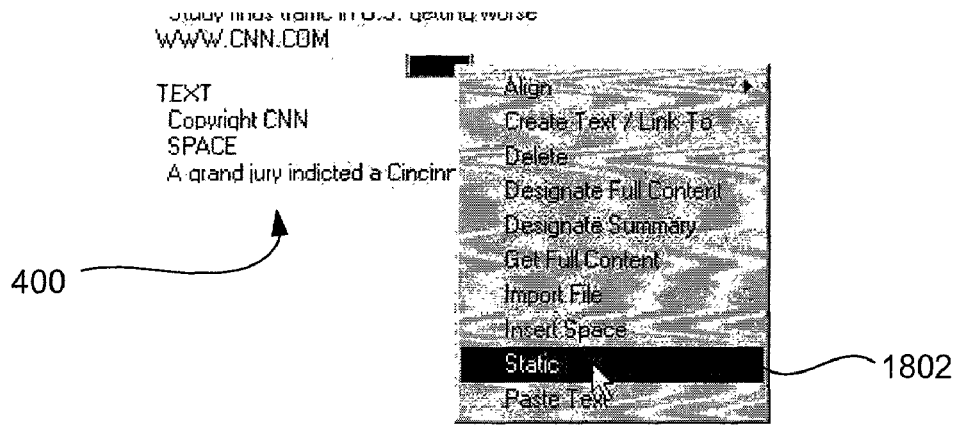
FIG. 18 illustrates a Static function that is used to make content "static;"

FIG. 18 illustrates a Static function 1802 that is used to make content "static." For example, when an image is dragged into the habitat, it retains a link back to its source page. This feature allows removal of the link so that on the wireless device, nothing happens upon selection of the image—the image acts as a static item.

Figure 19:
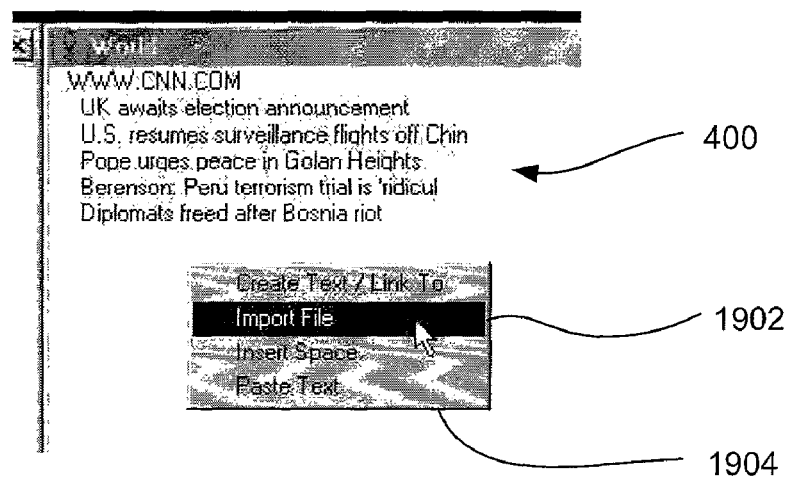
FIG. 19 depicts an Import File menu item which initiates an import file function.
Figure 20:
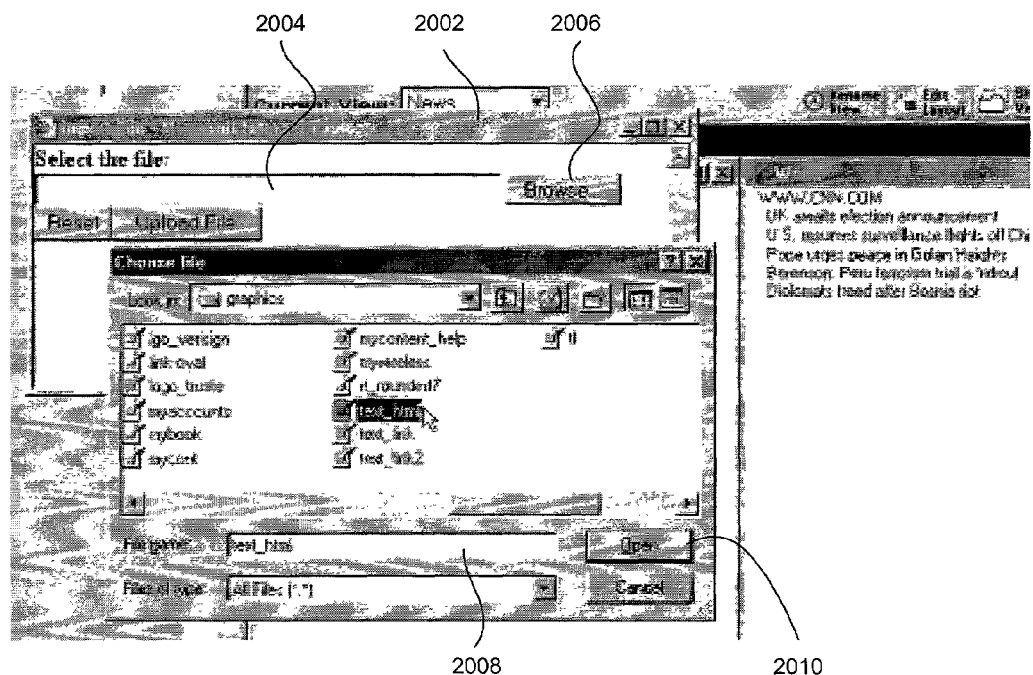
FIG. 20 shows a file selection window presented upon selection of the Import File menu item shown in FIG. 19.
Figure 21:
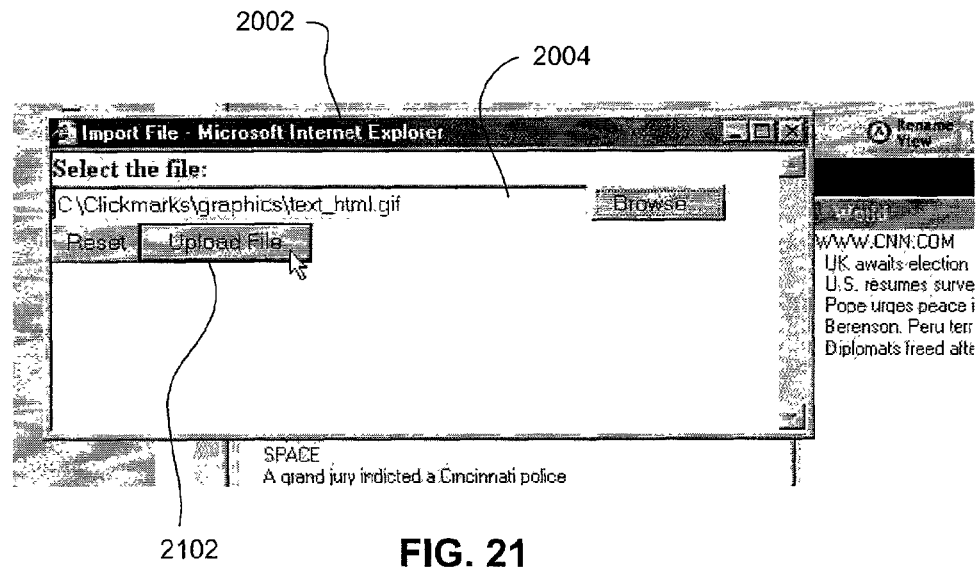
FIG. 21 illustrates a file selection window.
Figure 22:
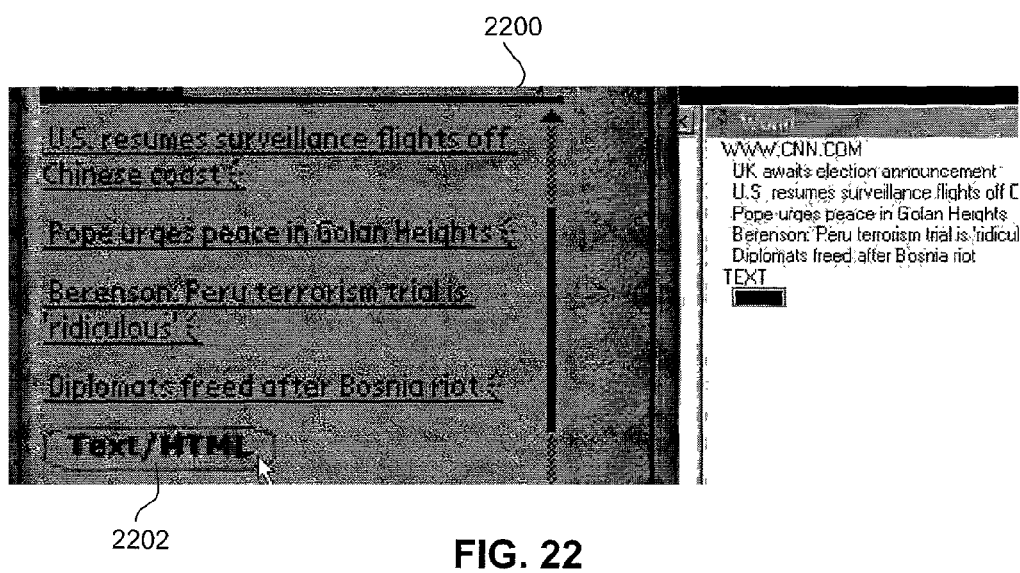
FIG. 22 shows a preview of the file inserted in the habitat as it will be shown on a display of the wireless device.

FIG. 19 depicts an Import File menu item 1902 which initiates an import file function. This function allows a user to import a file by browsing for a file and then selecting it for upload. As shown, the user positions the mouse in the habitat content manager window at the location where the file is to be imported to and right-clicks the mouse. The menu 1904 shown in the FIG. 19 is presented. Upon selection of the Import File menu item, a file selection window 2002 is presented. See FIG. 20. The file name and path can be input in the input field 2004 or can be selected using the browse function, accessed by selecting the Browse button 2006. Upon initiating the browse function, a Choose file window 2008 is presented, from which the user can select the file to import. Upon selecting the Open button 2010 on the Choose file window, the name appears in the input field of the file selection window, as shown in FIG. 21. Once the name and path of the file appears in the input field of the file selection window, the Upload File button 2102 is selected and the file is uploaded to the habitat. FIG. 22 shows a preview 2200 of the content as it will be shown on a display of the wireless device. In the example shown in FIGS. 19-22, the graphic file "text_html.gif" has been uploaded and the corresponding graphic 2202 is displayed in the preview.

The Import File function is useful if the user wants to use a particularly formatted logo for display on the wireless device. For example, the logo may be of high contrast or of a particular size. The Import File function imports the logo directly from a data source such as a hard drive, database, LAN, etc. and inserts it directly for display on the wireless device.

The present invention also allows a user to drag and drop a table into the habitat, where it is automatically reformatted for display on the viewing device.

In a preferred embodiment, the link can be based on a table mapping of a page. For example, suppose a headline (link) in the habitat says "School bus crashes . . . ". The headline is dragged into the habitat and the link information is captured as well. When the headline is clicked on in the habitat, the link is followed back to the source page, the school bus crash article is found by character matching (matching the headlines), and X number of characters are retrieved.

To improve reliability, particularly in cases where character matching may not work (headlines differ), the preferred method is to follow the link back to the source web page and parse the entire web page by table. Table tags identifying the correct article are retrieved and are associated with the link.

Web-pages are created using HTML (Hyper Text Markup Language). The content in a web-page is formatted using a tabular format where each table is composed of individual cells distributed into a number of rows and columns. A table may contain other tables within its individual cells. The tagging of selected information within a web-page hinges upon assigning an address to each item of content within the webpage. The addressing scheme takes into account the table(s), row(s), column(s) and cell(s) an item of content belongs to. An item of content can be identified by its address within a web-page and (ii) all the addressing schemes that take into account the table(s), row(s), column(s) and cell(s) an item of content belongs to. The addressing scheme works as follows:

The page is viewed to be composed of tables that may themselves contain other tables. The tables that are not contained in any other table (highest-level tables) are assigned identifying numbers starting from 1. Tables contained within the highest-level tables are assigned numbers that take into account the tables that contain them. If a table is not contained in any other table, then it may be assigned a number, say 3. If table number 3 contains two tables, then they will be assigned numbers 3-1 and 3-2 respectively. Each table is composed of a unique number of rows and columns. Each item of content resides within a cell that belongs to a specific row and column of a table. The complete address of an item of content is then the unique identifier of the table that contains it and the position of that item of content within that table.

Once the address of selected content is determined, it is converted into a hyperlink that contains the original content or a hyperlink to it, and its address. When a user drags and drops that selected content into a window of choice, that hyperlink and all of its associated information is sent through the window to the servers where it is entered into a database. This mechanism also allows a capture of configurable sections of a web-page, including individual words, lines, paragraphs.

More information regarding the mechanics of table-based transfer of information to a user device is provided in Provisional U.S. patent application entitled SYSTEM, METHOD AND COMPUTER PROGRAM PRODUCT FOR TRANSCODING TABULAR CONTENT FOR DISPLAY ON THIN CLIENT DEVICES BY WAY OF CONTENT ADDRESSING, filed Apr. 12, 2001 under Ser. No. 60/283,804, and which is herein incorporated by reference for all purposes.

Figure 23:
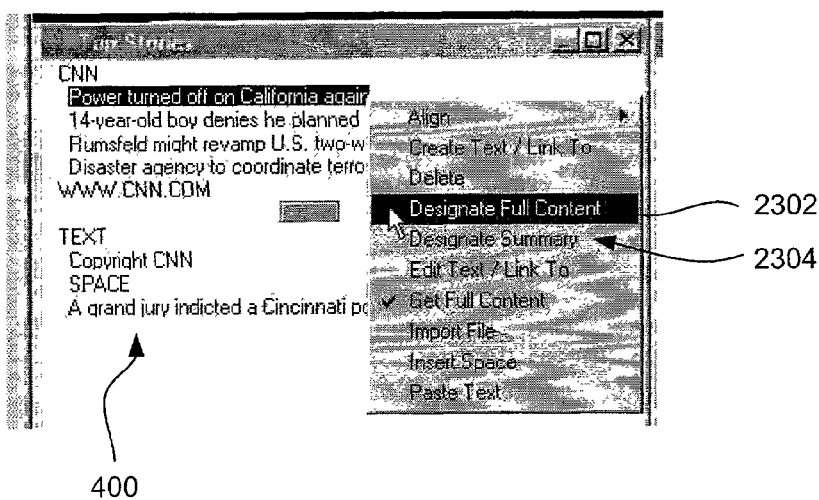
FIG. 23 depicts a Designate Full Content pop-up menu item that is used to allow designation of where on the source web page a desired portion of the web page actually resides.

FIG. 23 depicts a Designate Full Content pop-up menu item 2302 that is used to allow designation of where on the source web page a desired portion of the web page actually resides. When the link is selected, the menu is called, and this menu item is selected, the source web page is retrieved and a table-rendering routine is used to display the content with all of the HTML tables indicated. Upon selecting the "Table" button, the particular table is divided into finer elements (rows and cells). The user is then able to find the table, row, or cell that contains the exact content that he or she wants to associate with the link.

Figure 24:
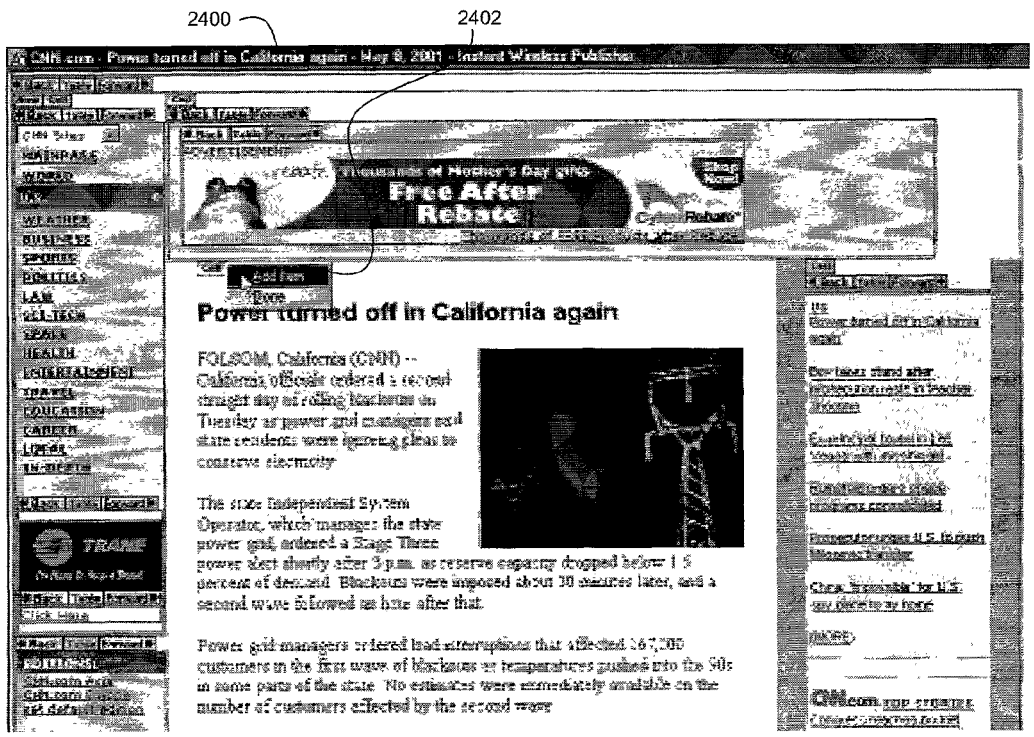
FIG. 24 illustrates a window displaying the resulting content with table information added.

In the example shown in FIG. 23, the full content of the article linked to the "Power turned off on California again" link is designated. FIG. 24 illustrates a window 2400 displaying the resulting content with table information added. From this window, the user can right-click on the appropriate "cell" and selecting "Add Item" from the pop-up menu 2402. The Add Item feature adds table information (table, row, or cell) which points to the location of the full article. When the user selects the headline on the wireless device, the table information is used to retrieve the correct content.

Figure 25:
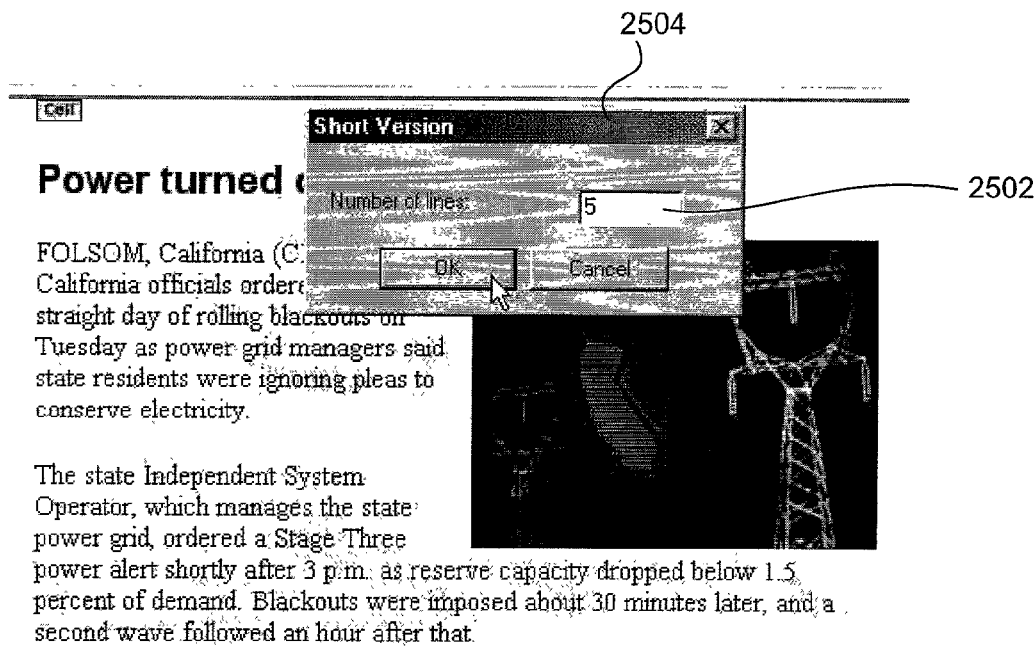
FIG. 25 illustrates a Short Version window for designating a number of lines of content to be retrieved.

To designate a summary of the linked article, a similar procedure is followed. In this case, the Designate Summary menu item 2304 is selected from the pop-up menu. The table, row or cell is designated and the number of lines to display on the wireless device is input in the Number of lines field 2502 of the Short Version window 2504 shown in FIG. 25. This feature is particularly useful for designating a shorter version of an article for display on a wireless telephone.

Figure 26:
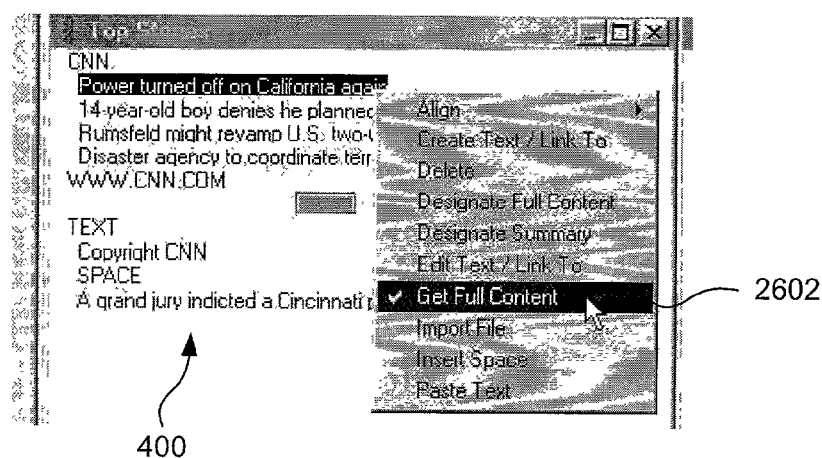
FIG. 26 illustrates selection of a "Get Full Content" menu item from a pop-up menu.

FIG. 26 illustrates selection of a "Get Full Content" menu item 2602 from a pop-up menu. This is a toggle option that, for a given link, allows the user to specify whether the full content of the story linked to should be displayed on the wireless device when the user clicks on the link, or whether only the summary should be displayed.

In another embodiment of the present invention, content associated with a pattern can be published. A pattern is a recording of a transaction. Upon replaying the pattern, user interaction with a remote content source is automated. Take, for example, a pattern for entering a query for weather conditions. A first page having a field allowing entry of a zip code is published. The zip code field has already been associated with a pattern that automatically enters information entered in the wireless device in the corresponding field on a remote weather information site. Upon the user entering zip code information in the zip code field, the pattern is replayed and selected portions of the resulting page from the remote weather information site are sent to the wireless device.

Figure 27:
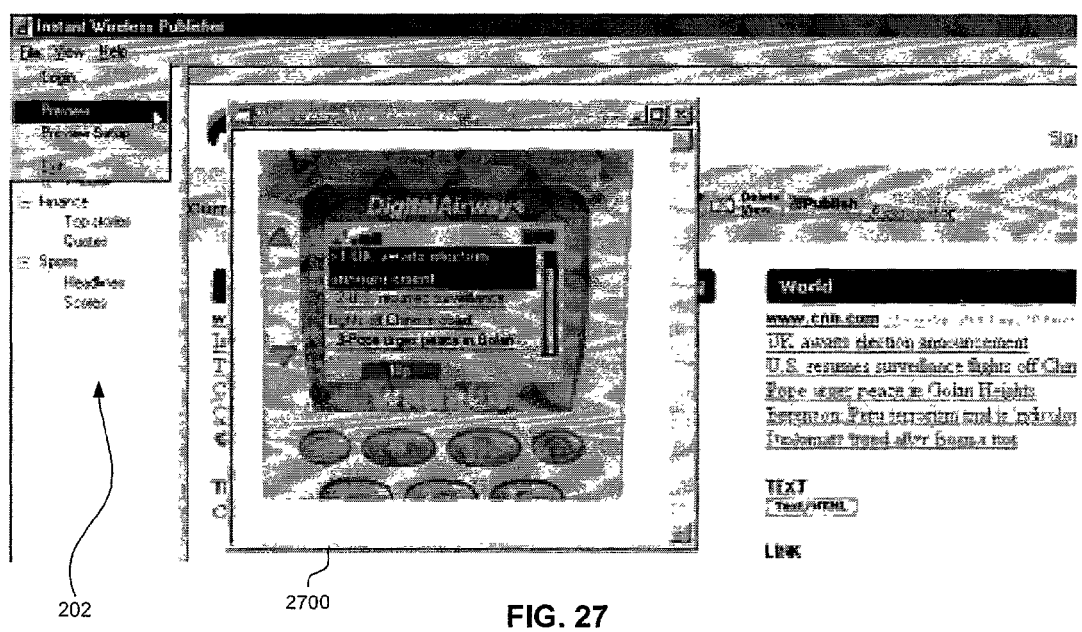
FIG. 27 depicts a Wireless Application Protocol (WAP) emulator that shows a preview of selected content as it will appear on a wireless device.

More information regarding pattern recording and replay is provided in Provisional U.S. patent application entitled SYSTEM, METHOD AND COMPUTER PROGRAM PRODUCT FOR THE RECORDING AND PLAYBACK OF TRANSACTION MACROS, filed Apr. 12, 2001 under Ser. No. 60/283,781 and assigned to common assignee, Clickmarks, Inc., and which is incorporated herein by reference FIG. 27 depicts a Wireless Application Protocol (WAP) emulator 2700 that shows a preview of selected content as it will appear on a wireless device. In use, a window title is selected in the navigation tree. The File menu is opened and the "Preview" menu item is selected. The emulator window opens and shows the contents of the window as they will appear on the wireless device.

The present invention thus enables personal content management and is able to aggregate content of one's choice and have it accessible on any device. More particularly, the present invention enables wireless access of all services. Accordingly, a broad aspect of the present invention allows any user to send or receive the content of their choice from any device, in particular wireless devices including, but not limited to, Personal Digital Assistants (PDA's) and Wireless phones.

In this regard, a preferred embodiment of the present invention includes the following parts:

1. A customizable information retrieval engine that allows users to aggregate content of their choice from any web site in existence. The content includes but is not restricted to text (i.e. news headlines, hyperlinks in web-pages), secure account information (i.e. email, bank accounts, utilities, and stock portfolios), services (i.e. maps, directions, weather, web searches), financial transactions (i.e. online shopping, buying, selling, trading, auctions, barters, comparisons), pre-recorded transaction patterns (i.e. information queries), and other dynamic tasks that involve interaction of the users with other web-based (client and server side) services. The aggregated content is displayed in a customized web-based habitat, which is amenable to presentation and content customization through an intuitive interface.

2. An interface of the above mentioned web-based habitat to a wireless enabling engine that takes the content of the habitat and renders them on all devices, especially wireless devices. All the content in the custom habitat is presented in a format that is supported by the wireless devices and therefore allows any content to become wireless enabled.

The customized information retrieval engine allows the aggregation of any content into a customized web-based habitat and the wireless enabling engine takes all the content in the habitat and makes it wireless enabled. Therefore, one embodiment of the present invention allows the use of the above mentioned habitat as a conduit that allows any content on the web to become wireless enabled instantaneously.

The formatting style can be specific to the wireless device used by the particular user. Note that the content can be formatted for display on a plurality of wireless devices so that the user can use any of a plurality of wireless devices to access the information. If the content has been formatted for a plurality of wireless devices, the wireless device sends a request for a particular type of formatting associated with that type of device. Preferably, transmission cost and reliability, as well as transmission time, are customizable and are user-customizable. For example, the mode of transmission can be chosen, the quality of the content in terms of bandwidth can be adjusted, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing content for output on a wireless device, comprising:
   displaying content selected for output on a wireless device on a management screen, wherein the content is displayed substantially as it will be displayed on the wireless device;
   allowing organization of the content;
   allowing formatting of the content;
   allowing creation of a link to content;
   allowing addition of text for output on the wireless device; and
   outputting a preview of a display screen of the wireless device, the preview including both textual and graphical content simultaneously, the preview depicting how the organized and formatted textual and graphical content will appear on the display screen of the wireless device relative to each other.

2. The method as recited in claim 1, wherein the content is first aggregated in a habitat having views, each of the views having at least one window associated therewith, wherein a user is allowed to define a number of windows associated with a particular view and at least a portion of the content associated with each view, wherein each view of the habitat represents content to be displayed in a particular view on the wireless device.

3. The method as recited in claim 1, wherein a graphic is imported directly from a data source for output on the wireless device at a user-designated position relative to other content when output on the display screen of the wireless device.

4. The method as recited in claim 1, wherein a link is dragged and dropped into the management screen.

5. The method as recited in claim 1, wherein a maximum character length of text content displayed upon selection of a link on the wireless device is configurable.

6. The method as recited in claim 1, wherein a number of lines of text content displayed upon selection of a link on the wireless device is configurable.

7. The method as recited in claim 1, wherein the content is a table.

8. The method as recited in claim 1, wherein at least one of a maximum character length and a number of lines of text content displayed upon selection of a link on the wireless device is configurable, wherein a full text of the text content is output on the wireless device upon receiving a request from the user.

9. The method as recited in claim 1, wherein the wireless device is at least one of a personal digital assistant (PDA), a handheld computer, a wireless telephone, a device connected to a wireless modem, a pager, and a standard telephone that transmits text-to-speech audio output.

10. The method as recited in claim 1, further comprising formatting text content for audible output on the wireless device.

11. The method as recited in claim 1, further comprising formatting text content for audible output on a wired device.

12. A computer program product for managing content for output on a wireless device, disposed on a non-transitory computer readable medium, comprising:
    computer code for displaying content selected for output on a wireless device on a management screen, wherein the content is displayed substantially as it will be displayed on the wireless device;
    computer code for allowing organization of the content;
    computer code for allowing formatting of the content;
    computer code for allowing creation of a link to content;
    computer code for allowing addition of text for output on the wireless device; and
    computer code for outputting a preview of a display screen of the wireless device, the preview including both textual and graphical content simultaneously, the preview depicting how the organized and formatted textual and graphical content will appear on the display screen of the wireless device relative to each other.

13. The computer program product as recited in claim 12, wherein the content is first aggregated in a habitat.

14. The computer program product as recited in claim 12, wherein a graphic is imported directly from a data source for output on the wireless device.

15. The computer program product as recited in claim 12, wherein a link is dragged and dropped into the management screen.

16. The computer program product as recited in claim 12, wherein a maximum character length of text content displayed upon selection of a link on the wireless device is configurable.

17. The computer program product as recited in claim 12, wherein a number of lines of text content displayed upon selection of a link on the wireless device is configurable.

18. The computer program product as recited in claim 12, wherein the content is a table.

19. The computer program product as recited in claim 12, wherein at least one of a maximum character length and a number of lines of text content displayed upon selection of a link on the wireless device is configurable, wherein a full text of the text content is output on the wireless device upon receiving a request from the user.

20. The computer program product as recited in claim 12, wherein the wireless device is at least one of a personal digital assistant (PDA), a handheld computer, a wireless telephone, a device connected to a wireless modem, a pager, and a standard telephone that transmits text-to-speech audio output.

21. A system for managing content for output on a wireless device including logic stored on a non-transitory computer readable medium, the logic for:
displaying content selected for output on a wireless device on a management screen, wherein the content is displayed substantially as it will be displayed on the wireless device;
allowing organization of the content;
allowing formatting of the content;
allowing creation of a link to content;
allowing addition of text for output on the wireless device; and
outputting a preview of a display screen of the wireless device, the preview including both textual and graphical content simultaneously, the preview depicting how the organized and formatted textual and graphical content will appear on the display screen of the wireless device relative to each other.

22. The system as recited in claim 21, wherein the content is first aggregated in a habitat.

23. The system as recited in claim 21, wherein a graphic is imported directly from a data source for output on the wireless device.

24. The system as recited in claim 21, wherein a link is dragged and dropped into the management screen.

25. The system as recited in claim 21, wherein a maximum character length of text content displayed upon selection of a link on the wireless device is configurable.

26. The system as recited in claim 21, wherein a number of lines of text content displayed upon selection of a link on the wireless device is configurable.

27. The system as recited in claim 21, wherein the content is a table.

28. The system as recited in claim 21, wherein at least one of a maximum character length and a number of lines of text content displayed upon selection of a link on the wireless device is configurable, wherein a full text of the text content is output on the wireless device upon receiving a request from the user.

29. The system as recited in claim 21, wherein the wireless device is at least one of a personal digital assistant (PDA), a handheld computer, a wireless telephone, a device connected to a wireless modem, a pager, and a standard telephone that transmits text-to-speech audio output.

30. A method for managing content for output on a wireless device, comprising
allowing a user to select content for output on a wireless device;
aggregating at least a portion of the content selected for output on the wireless device in a habitat having views, each of the views having at least one window associated therewith, wherein a user is allowed to define a number of windows associated with a particular view, wherein each view of the habitat represents content to be displayed in a particular view on the wireless device;
displaying the content on a management screen;
allowing a user to spatially organize the content as it will be output on the wireless device;
allowing a user to create a collection of links to content, the links being output on the wireless device, wherein selection of one of the links on the wireless device causes additional content to be downloaded to the wireless device from a remote data source and output on the wireless device;
wherein the user is allowed to name the link to the linked content;
allowing a user to configure an email service for accessing email messages on the wireless device;
transmitting the content to the wireless device via a wireless link;
outputting a preview of a display screen of the wireless device, the preview including both textual and graphical content simultaneously, the preview depicting how the organized and formatted textual and graphical content will appear on the display screen of the wireless device relative to each other
wherein the content output by the wireless device includes a web search service, wherein the user is allowed to access the web search service from the wireless device.

31. The method as recited in claim 30, wherein a link is dragged and dropped in the management screen.

32. The method as recited in claim 30, wherein a maximum character length of text content displayed upon selection of a link on a wireless device is configurable.

33. The method as recited in claim 30, wherein a number of lines of text content displayed upon selection of a link on the wireless device is configurable.

34. The method as recited in claim 30, wherein the content is a table.

35. The method as recited in claim 30, wherein at least one of a maximum character length and a number of lines of text content displayed upon selection of a link on the wireless device is configurable, wherein a full text of the text content is output on the wireless device upon receiving a request from the user.

36. The method as recited in claim 30, wherein the wireless device is at least one of a personal digital assistant (PDA), a handheld computer, a wireless telephone, a device connected to a wireless modem, a pager, and a standard telephone that transmits text-to-speech audio output.

37. The method as recited in claim 30, wherein the wireless device is a wireless telephone.

38. A method for structuring navigation data in a wireless publisher, comprising:
aggregating content selected for output on a wireless device in a habitat having views, each of the views having windows associated therewith;

depicting an identifier of each of the views in a navigation tree;

showing identifiers of the windows under the identifier of the associated view in the navigation tree;

displaying links of the windows under the identifiers of the associated windows; and allowing linking from one window in one view to another window in another view using the navigation tree.

39. The method as recited in claim 38, wherein a link is created in a window upon dragging a link onto the identifier of the window in the navigation tree.

40. A method for presenting a preview of content on a display of a wireless device, comprising:

aggregating content selected for output on a wireless device in a habitat;

displaying the content on a management screen amenable to allowing formatting of the content; and outputting a preview of a display screen of the wireless device, the preview including both textual and graphical content simultaneously, the preview depicting how the organized and formatted textual and graphical content will appear on the display screen of the wireless device relative to each other.

41. The method as recited in claim 40, wherein the preview further includes a depiction of a chassis of the wireless device.

42. A method for managing content for output on a wireless device, comprising:

allowing a user to select content for output on a wireless device;

aggregating at least a portion of the content selected for output on the wireless device in a habitat;

displaying content selected for output on a wireless device on a management screen, wherein the wireless device is at least one of a personal digital assistant (PDA), a hand-held computer, a wireless telephone, and a pager;

allowing a user to spatially organize the content thereby defining how the content will be spatially organized on the wireless device;

allowing a user to create a link to content, the link being output on the wireless device, wherein selection of the link on the wireless device causes additional content to be downloaded to the wireless device from a remote data source and output on the wireless device;

allowing a user to configure an email service for accessing email messages on the wireless device;

transmitting the content to the wireless device via a wireless link;

wherein the content output by the wireless device includes a web search service, wherein the user is allowed to access the web search service from the wireless device.

43. The method as recited in claim 42, further comprising formatting text content for audible output on the wireless device.

44. The method as recited in claim 42, further comprising formatting text content for audible output on a wired device.

* * * * *

UNITED STATES PATENT AND TRADEMARK OFFICE
CERTIFICATE OF CORRECTION

| | |
|---|---|
| PATENT NO. | : 8,001,490 B2 |
| APPLICATION NO. | : 09/902929 |
| DATED | : August 16, 2011 |
| INVENTOR(S) | : Bokhari et al. |

It is certified that error appears in the above-identified patent and that said Letters Patent is hereby corrected as shown below:

Claim 30, col. 12, line 5; please replace "comprising" with --comprising:--.

Signed and Sealed this
Seventh Day of February, 2012

David J. Kappos
*Director of the United States Patent and Trademark Office*